United States Patent
Kawase et al.

(10) Patent No.: US 8,636,818 B2
(45) Date of Patent: Jan. 28, 2014

(54) FUEL GAS PURIFICATION APPARATUS, POWER GENERATION SYSTEM, AND FUEL SYNTHESIS SYSTEM

(75) Inventors: Makoto Kawase, Kanagawa (JP); Kazuyoshi Ichikawa, Kanagawa (JP); Maromu Ohtaka, Kanagawa (JP); Hiroshi Morita, Kanagawa (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 848 days.

(21) Appl. No.: 12/865,868

(22) PCT Filed: Jan. 21, 2009

(86) PCT No.: PCT/JP2009/050811
§ 371 (c)(1), (2), (4) Date: Aug. 3, 2010

(87) PCT Pub. No.: WO2009/098936
PCT Pub. Date: Aug. 13, 2009

(65) Prior Publication Data
US 2010/0326087 A1   Dec. 30, 2010

(30) Foreign Application Priority Data
Feb. 5, 2008 (JP) .................................. 2008-025597

(51) Int. Cl.
*C10J 3/00*    (2006.01)
*C01B 3/24*    (2006.01)

(52) U.S. Cl.
USPC ............. 48/210; 48/198.2; 423/644; 423/650

(58) Field of Classification Search
USPC ....................... 48/197 R, 198.2, 210; 423/644
See application file for complete search history.

(56) References Cited

U.S. PATENT DOCUMENTS

| | | |
|---|---|---|
| 6,190,621 B1 | 2/2001 | Yamashita et al. |
| 7,214,252 B1 | 5/2007 | Krumm et al. |

(Continued)

FOREIGN PATENT DOCUMENTS

| | | |
|---|---|---|
| CN | 1673317 | 9/2005 |
| DE | 19926202 | 2/2001 |

(Continued)

OTHER PUBLICATIONS

Office Action issued Oct. 12, 2012 by the Chinese Patent Office in corresponding Chinese Patent Application No. 200980103522.1, 10 pages.

(Continued)

*Primary Examiner* — Matthew Merkling
(74) *Attorney, Agent, or Firm* — Young & Thompson (57) ABSTRACT

An apparatus which includes: a carbonizer (1) which pyrolyzes a biomass to yield a pyrolysis gas and a carbonization product; a furnace (2) in which the carbonization product supplied from the carbonizer (1) is burned; a closed vessel (3) which is disposed in the furnace (2) and holds therein a carbonate (4) which has been melted by the heat generated by the carbonization product burned in the furnace (2); an introduction pipe (5) disposed so that the pyrolysis gas is introduced into the molten carbonate (4) in the closed vessel (3); and a fuel gas supply pipe (6) disposed so that a fuel gas, which is the pyrolysis gas sent through the introduction pipe (5), passed through the molten carbonate (4), and purified by reaction with the molten carbonate (4), is sent from the closed vessel (3) to the outside of the furnace (2).

14 Claims, 7 Drawing Sheets

(56) References Cited

U.S. PATENT DOCUMENTS

| | | | |
|---|---|---|---|
| 2002/0001557 A1* | 1/2002 | Surma | 423/245.3 |
| 2002/0194782 A1 | 12/2002 | Paisley | |
| 2005/0247553 A1 | 11/2005 | Ichikawa et al. | |
| 2007/0261303 A1* | 11/2007 | Surma et al. | 48/197 R |
| 2008/0216405 A1 | 9/2008 | Ichikawa et al. | |
| 2009/0000190 A1* | 1/2009 | Surma et al. | 48/65 |

FOREIGN PATENT DOCUMENTS

| | | |
|---|---|---|
| EP | 1 580 253 | 9/2005 |
| GB | 1 480 001 | 7/1977 |
| JP | 07-169497 | 7/1995 |
| JP | 10-235128 | 9/1998 |
| JP | 11-042421 | 2/1999 |
| JP | 2000-140621 | 5/2000 |
| JP | 2002-093452 | 3/2002 |
| JP | 2003-243019 | 8/2003 |
| JP | 2006-002042 | 1/2006 |
| JP | 2008-101066 | 5/2008 |
| WO | 00/77128 | 12/2000 |
| WO | 2004/072207 | 8/2004 |
| WO | WO 2006/022687 | 3/2006 |

OTHER PUBLICATIONS

International Search Report, PCT/JP2009/050811, Apr. 21, 2009.
Extended European Search Report dated Nov. 7, 2012 issued by the European Patent Office in European Application No. 09707179.9, 8 pages.

* cited by examiner

FUEL GAS PURIFICATION APPARATUS, POWER GENERATION SYSTEM, AND FUEL SYNTHESIS SYSTEM

TECHNICAL FIELD

This invention relates to a fuel gas purification apparatus, a power generation system, and a fuel synthesis system. More particularly, it relates to those useful when applied in removing and purifying unburned matter, ash and impurities contained in a pyrolysis gas generated by gasifying biomass, and utilizing a fuel gas obtained by the purification.

BACKGROUND ART

In recent years, attention has been paid to utilization of biomass as energy. Known methods for utilizing biomass as energy include a method which directly burns biomass to obtain thermal and electrical energy, a method which obtains a fuel gas by pyrolysis, and so on.

Figure 7:
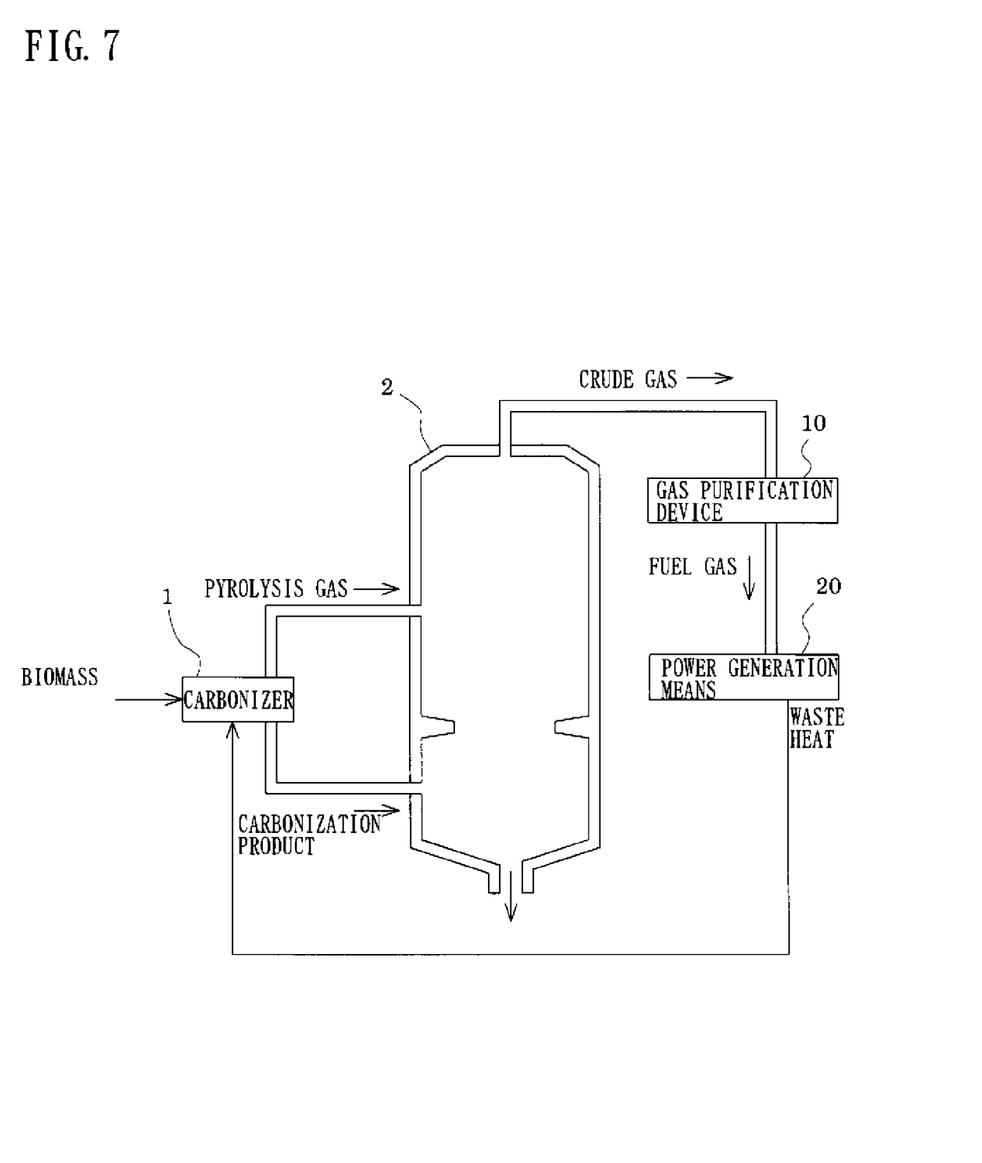
FIG. 7 is a schematic configurational drawing of a power generation system equipped with a fuel gas purification apparatus according to a conventional technology which purifies a fuel gas from biomass.

FIG. 7 is a schematic configurational drawing of a power generation system equipped with a fuel gas purification apparatus for purifying a fuel gas from biomass according to a conventional technology.

As shown there, a carbonizer 1 heats supplied biomass to yield a pyrolysis gas and a carbonization product, and supplies them to the interior of a furnace 2. The furnace 2 is composed of a gasification and combustion section as a lower section, and a gas reforming section as an upper section. In the lower gasification and combustion section, the carbonization product supplied from the carbonizer 1 is partly burned by air or oxygen separately supplied to produce a high temperature gas, and the high temperature gas is guided to the upper gas reforming section. In the upper gas reforming section, the pyrolysis gas supplied from the carbonizer 1 is reformed in a high temperature zone attributed to the high temperature gas, whereby a crude gas containing ash and impurities is produced. The crude gas is desulfurized and dedusted by a gas purification device 10 to purify a fuel gas consisting essentially of carbon monoxide and hydrogen.

The so produced fuel gas is supplied to a power generation means 20 composed, for example, of a gas turbine, a fuel cell or the like, and the power generation means 20 generates electric power with the use of this fuel gas. The fuel gas is also used otherwise as a material for a synthetic liquid fuel.

Waste heat generated by the power generation means 20 is sent to the carbonizer 1 to be utilized as a heat source for heating the biomass.

The conventional gas purification device 10 is composed of a dedusting device, a COS converter, a desulfurizer, a gas cooler, a gas cleaner, etc. in order to remove ash, tar and impurities in the crude gas. Thus, the equipment configuration for performing gas purification has become complicated, thereby making it difficult to enhance the operability of the equipment, and resulting in a cost increase.

Furthermore, air and nitrogen are supplied from the outside into the furnace 2 in order to burn the carbonization product in the gasification and combustion section of the furnace 2. Thus, the fuel gas (crude gas) is diluted with the air, nitrogen, etc., with the result that the calories, per unit volume, of the fuel gas are decreased.

The following patent document 1 exists as a publication which discloses the same type of technology as the above-described conventional technology.

Patent Document 1: JP-A-2006-2042

DISCLOSURE OF THE INVENTION

Problems to be Solved by the Invention

The present invention has been accomplished in the light of the above circumstances. It is an object of the present invention to provide a fuel gas purification apparatus of a simple configuration which can purify a high-calorie fuel gas from biomass. It is another object of the present invention to provide a power generation system and a fuel synthesis system having a fuel gas purification apparatus of a simple configuration which can purify a high-calorie fuel gas from biomass.

Means for Solving the Problems

A first aspect of the present invention, intended to attain the above objects, lies in a fuel gas purification apparatus, comprising: a carbonizer which pyrolyzes biomass to produce a pyrolysis gas and a carbonization product; a furnace which is supplied with the carbonization product produced by the carbonizer and which burns the carbonization product; a closed vessel disposed within the furnace and accommodating a molten carbonate which is a carbonate melted by heat of the carbonization product burned in the furnace; an introduction pipe disposed to introduce the pyrolysis gas produced by the carbonizer into the molten carbonate in the closed vessel; and a fuel gas supply pipe disposed to send a fuel gas, which is the pyrolysis gas sent through the introduction pipe, passed through the molten carbonate, and purified by reaction with the molten carbonate, from within the closed vessel to an outside of the furnace.

According to such a first aspect, the pyrolysis gas and the carbonization product are produced from the biomass, and the pyrolysis gas is purified with the molten carbonate to form a fuel gas. This fuel gas is higher in calories per unit volume than a conventional fuel gas. On this occasion, the purification of the pyrolysis gas is performed in the closed vessel by the heat of the carbonization product burned in the furnace. Thus, there is no need to provide an extensive gas purification device as in the conventional technology. As a result, cost reduction of the power generation system can be achieved.

A second aspect of the present invention lies in the fuel gas purification apparatus according to the first aspect, wherein the carbonizer is adapted to pyrolyze the biomass by waste heat of the furnace.

According to such a second aspect, the waste heat of the furnace is effectively used for the pyrolysis of the carbonization product. Thus, the energy efficiency of the entire fuel gas purification apparatus can be increased.

A third aspect of the present invention lies in the fuel gas purification apparatus according to the first or second aspect, wherein the closed vessel is disposed within the furnace.

According to such a third aspect, the closed vessel is disposed within the furnace. Thus, the thermal energy of the carbonization product burned in the furnace is imparted to the carbonate of the closed vessel most efficiently. Since the closed vessel is disposed within the furnace, moreover, there is no need to provide any part of the gas purification apparatus outside the furnace. Hence, a space saving as a whole can be made.

A fourth aspect of the present invention lies in the fuel gas purification apparatus according to anyone of the first to third aspects, further comprising hydroxide supply means for supplying a hydroxide to the molten carbonate.

According to such a fourth aspect, when the hydroxide is supplied to the molten carbonate in the closed vessel by the hydroxide supply means, carbon dioxide contained in the molten carbonate or the fuel gas (pyrolysis gas) reacts with the hydroxide, forming a carbonate. That is, the supply of the hydroxide to the closed vessel obtains the same effect as the supply of a carbonate to the closed vessel. Moreover, the hydroxide absorbs carbon dioxide to turn into a carbonate. Thus, the amount of carbon dioxide emissions can be decreased.

A fifth aspect of the present invention lies in the fuel gas purification apparatus according to any one of the first to fourth aspects, wherein the molten carbonate contains a catalyst.

According to such a fifth aspect, the catalyst contained in the molten carbonate accelerates the chemical reaction between the pyrolysis gas and the molten carbonate. As a result, the pyrolysis gas can be purified more promptly.

A sixth aspect of the present invention lies in the fuel gas purification apparatus according to any one of the first to fifth aspects, further comprising bubble subdividing means for finely dividing bubbles of the pyrolysis gas having passed through the molten carbonate.

According to such a sixth aspect, bubbles of the pyrolysis gas introduced into the molten carbonate are finely divided by the bubble subdividing means, and the surface areas of the bubbles become larger than those before subdivision. In conformity with the increases in the surface areas, the bubbles of the pyrolysis gas contact the molten carbonate with greater contact areas. Thus, the reaction between the pyrolysis gas and the molten carbonate is accelerated, and the pyrolysis gas can be purified more promptly.

A seventh aspect of the present invention lies in the fuel gas purification apparatus according to any one of the first to sixth aspects, wherein the carbonizer contacts an outer surface of the furnace.

According to such a seventh aspect, the waste heat of the furnace is directly transferred to the carbonizer. Thus, the waste heat of the furnace can be effectively used as the heat source for the carbonizer more efficiently than when the waste heat of the furnace is indirectly utilized via a heat exchanger or the like. Hence, the thermal efficiency of the entire fuel gas purification apparatus can be increased.

An eighth aspect of the present invention lies in a power generation system, comprising: the fuel gas purification apparatus according to any one of the first to seventh aspects; and power generation means for generating electric power with use of the fuel gas from the fuel gas supply pipe.

According to such an eighth aspect, power generation can be performed using the high-calorie fuel gas purified by the fuel gas purification apparatus.

A ninth aspect of the present invention lies in the power generation system according to the eighth aspect, wherein the power generation means is equipped with a high temperature fuel cell having a fuel electrode which is fed with the fuel gas from the fuel gas supply pipe.

According to such a ninth aspect, a high-calorie fuel gas can be supplied to a molten carbonate fuel cell or a solid oxide fuel cell requiring a high operating temperature.

A tenth aspect of the present invention lies in the power generation system according to the eighth aspect, wherein the power generation means is equipped with a gas engine which is operated by the fuel gas from the fuel gas supply pipe, and a generator which is actuated by operation of the gas engine.

According to such a tenth aspect, power generation can be carried out using the gas engine.

An eleventh aspect of the present invention lies in the power generation system according to the eighth aspect, wherein the power generation means includes a turbine combustor which burns the fuel gas from the fuel gas supply pipe, and a gas turbine which obtains power upon expansion of the fuel gas from the turbine combustor to drive a generator.

According to such an eleventh aspect, power generation can be carried out using the gas turbine.

A twelfth aspect of the present invention lies in the power generation system according to any one of the eighth to eleventh aspects, wherein the carbonizer is adapted to pyrolyze the biomass by waste heat of the power generation means.

According to such a twelfth aspect, the waste heat of the power generation means is effectively used for the pyrolysis of the carbonization product. Thus, the energy efficiency of the entire power generation system can be increased.

A thirteenth aspect of the present invention lies in a fuel synthesis system, comprising: the fuel gas purification apparatus according to any one of the first to seventh aspects; a liquid fuel synthesizer which synthesizes a liquid fuel from the fuel gas from the fuel gas supply pipe; and water supply means which supplies water into the carbonizer or the closed vessel so that a proportion of water in the fuel gas supplied to the outside of the furnace can be adjusted.

According to such a thirteenth aspect, the water supply means is adjusted, whereby the ratio of carbon monoxide to hydrogen in the fuel gas can be adjusted to a ratio suitable for a liquid fuel to be synthesized. Thus, a desired liquid fuel can be produced.

A fourteenth aspect of the present invention lies in the fuel synthesis system according to the thirteenth aspect, wherein the carbonizer is adapted to pyrolyze the biomass by waste heat of the liquid fuel synthesizer.

According to such a fourteenth aspect, the waste heat of the liquid fuel synthesizer is effectively used for the pyrolysis of the carbonization product. Thus, the energy efficiency of the entire fuel synthesis system can be increased.

Effects of the Invention

According to the present invention, a fuel gas purification apparatus of a simple configuration which can purify a high-calorie fuel gas from biomass is provided. Furthermore, a power generation system and a fuel synthesis system having the fuel gas purification apparatus are provided.

DESCRIPTION OF THE NUMERALS 1, 1A Carbonizer
2 Furnace
2a Gasification and combustion section
2b Vessel disposition section
3 Closed vessel
4 Molten carbonate (carbonate)
5 Introduction pipe
6 Fuel gas supply pipe
7 Carbonization product introduction pipe
8 Sodium hydroxide supply means
10 Gas purification device
20 Power generation means
30 Liquid fuel synthesizer
31 Water supply means
41 Upper fixing portion
42 Lower fixing portion
43 Body portion
44 Internal space
45 Screw blade
46 Biomass introduction pipe
47 Biomass
50 Stirrer (bubble subdividing means)

BEST MODE FOR CARRYING OUT THE INVENTION

Embodiment 1

The best mode for carrying out the present invention will be described below. The descriptions of the present embodiment are illustrative, and the present invention is not limited to the following descriptions.

Figure 1:
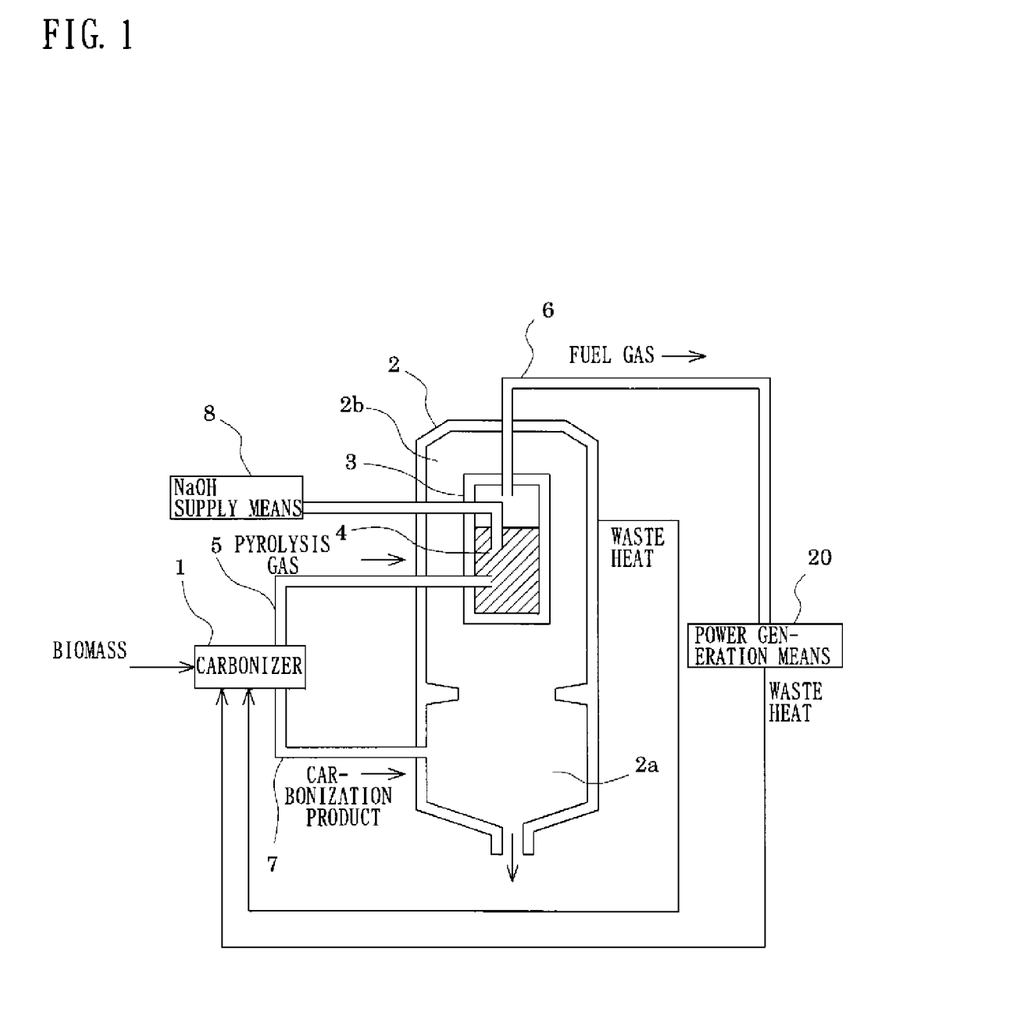
FIG. 1 is a schematic configurational drawing of a power generation system equipped with a fuel gas purification apparatus according to Embodiment 1.

FIG. 1 is a schematic configurational drawing of a power generation system equipped with a fuel gas purification apparatus according to Embodiment 1.

As shown there, the fuel gas purification apparatus according to Embodiment 1 comprises a carbonizer 1 for pyrolyzing biomass, a furnace 2 for burning a carbonization product, a closed vessel 3 disposed within the furnace 2, an introduction pipe 5 for introducing a pyrolysis gas from the carbonizer 1 into the closed vessel 3, a carbonization product introduction pipe 7 for introducing the carbonization product from the carbonizer 1 into the furnace 2, a fuel gas supply pipe 6 for supplying a power generation means 20 with a fuel gas purified by the closed vessel 3, and a sodium hydroxide supply means 8 (in the drawing, written as "NaOH supply means") for supplying sodium hydroxide (NaOH) to the closed vessel 3.

The carbonizer 1 is supplied with wood-based biomass, waste-based biomass such as urban refuse, and mixed biomass comprising them. The carbonizer 1 bakes biomass while steaming it, thereby pyrolyzing it to yield a pyrolysis gas and a carbonization product. The pyrolysis gas is composed of volatiles in the biomass, and consists essentially of carbon monoxide, hydrogen, water, hydrocarbons, tar, etc. On the other hand, the carbonization product is so-called char such as carbon or charcoal.

The furnace 2 is hollow inside, and is composed of a gasification and combustion section 2a as a lower section, and a vessel disposition section 2b as an upper section. In the gasification and combustion section 2a, the carbonization product supplied from the carbonizer 1 via the carbonization product introduction pipe 7 is burned by air or oxygen separately introduced into the gasification and combustion section 2a to produce a high temperature gas, and the high temperature gas is guided to the upper vessel disposition section 2b. Of the burned carbonization product, ash having a relatively low melting point is discharged as molten slag from the bottom of the furnace 2.

In the vessel disposition section 2b of the furnace 2, the closed vessel 3 is disposed. The interior of the closed vessel 3 is separated from the space inside the furnace 2, and a carbonate 4 is accommodated inside the closed vessel 3. The closed vessel 3 is disposed in the vessel disposition section 2b full of the aforementioned high temperature gas. Thus, the carbonate 4 within the closed vessel 3 is heated by the heat of the high temperature gas, and melted thereby. Hereinafter, this melted carbonate 4 will be referred to as a molten carbonate 4.

As the molten carbonate 4 of the present invention, various alkali metal carbonates, such as lithium carbonate ($Li_2CO_3$), sodium carbonate ($Na_2CO_3$), and potassium carbonate ($K_2CO_3$), can be used alone or as a mixture of a plurality of them. In addition to these alkali metal carbonates, carbonates, such as those of magnesium (Mg), calcium (Ca), strontium (Sr), barium (Ba) and cerium (Ce), can be used as the molten carbonates.

The carbonizer 1 and the closed vessel 3 are connected via the introduction pipe 5. An end of the introduction pipe 5 is disposed in an upper part of the carbonizer 1 so that the pyrolysis gas purified by the carbonizer 1 is introduced, while the other end of the introduction pipe 5 is disposed in the molten carbonate 4 within the closed vessel 3. The pyrolysis gas generated in the carbonizer 1 is supplied into the molten carbonate 4 within the closed vessel 3 via the introduction pipe 5.

As described here, the pyrolysis gas fed via the introduction pipe 5 flows through the molten carbonate 4 in the closed vessel 3. On this occasion, the pyrolysis gas is deprived of impurities, as will be detailed below, by its reaction with the molten carbonate 4, and the fuel gas is purified from the pyrolysis gas.

Examples of representative impurity elements in the pyrolysis gas are sulfur (S), halogens (F, Cl) and nitrogen (N). In a high-temperature reducing atmosphere, representative impurity gases, such as hydrogen sulfide ($H_2S$), hydrogen chloride (HCl), hydrogen fluoride (HF), and ammonia ($NH_3$), aregenerated from these elements.

A mechanism for removing the above-mentioned impurities with the use of the molten carbonate 4 (alkali metal carbonate, $M_2CO_3$, M=Li, Na, K) in the present embodiment will be described below.

$H_2S$ formed in the reducing atmosphere is taken up as $S^{2-}$ into the molten carbonate 4, and trapped there as an alkali metal sulfide ($M_2S$). HCl or HF is taken up as $Cl^-$ or $F^-$ into the molten carbonate 4, and trapped there as an alkali metal chloride (MCl) for chlorine, or as an alkali metal fluoride (MF) for fluorine.

Unburned matter contained in the pyrolysis gas introduced from the carbonizer 1, namely, ash, can be collected as dust within the closed vessel 3, because the molten carbonate 4 is a liquid. Further, tar contained in the pyrolysis gas is similarly decomposed upon reaction with the molten carbonate 4.

As described above, the pyrolysis gas generated in the carbonizer 1 is purified by the molten carbonate 4, whereupon a fuel gas consisting essentially of carbon monoxide and hydrogen is purified.

The molten carbonate 4 may contain a catalyst. The catalyst accelerates the chemical reaction between the pyrolysis gas and the molten carbonate 4, whereby the pyrolysis gas can be purified more promptly. As this catalyst, a metal, an alloy, a metal oxide, or nickel ceramics can be used. As examples of the metal, there can be named nickel (Ni), copper (Cu), iron (Fe), vanadium (V), tungsten (W), titanium (Ti), cobalt (Co), tin (Sn), magnesium (Mg), ruthenium (Ru), palladium (Pd), and zinc (Zn). The alloy comprises two or more of these metals. The metal oxide is the oxidation product of any of these metals, or is a complex oxide formed by oxidation of two or more of these metals. The catalyst is preferably contained as a powder in the molten carbonate 4.

The closed vessel 3 and the power generation means 20 are connected via the fuel gas supply pipe 6. An end of the fuel gas supply pipe 6 is disposed in an upper part of the interior of the closed vessel 3, while the other end of the fuel gas supply pipe 6 is connected to the power generation means 20. Through the fuel gas supply pipe 6, the fuel gas purified within the closed vessel 3 is supplied to the power generation means 20 located outside the furnace 2.

The power generation means 20 is composed of, for example, a molten carbonate fuel cell (MCFC) equipped with a fuel electrode which is fed with the fuel gas from the fuel gas supply pipe 6. The MCFC generally has high efficiency among fuel cells, and can utilize carbon monoxide as a fuel.

The power generation means 20 is not limited, as long as it generates electric power with the use of the fuel gas from the fuel gas supply pipe 6. For example, the power generation means 20 may be composed of a gas engine which is operated by the fuel gas from the fuel gas supply pipe 6, and a generator which is actuated by the operation of the gas engine. Alternatively, the power generation means 20 may be composed of a turbine combustor which burns the fuel gas from the fuel gas supply pipe 6, and a gas turbine which obtains power upon expansion of the fuel gas from the turbine combustor to drive a generator.

The power generation means 20 and the carbonizer 1 are configured such that waste heat generated by the power generation means 20 is utilized via a heat exchanger (not shown) or the like as a heat source for the carbonizer 1 which heats the biomass. By this configuration, the efficiency of the energy of the entire power generation system can be improved. Moreover, the furnace 2 and the carbonizer 1 are configured such that waste heat generated by the furnace 2 is utilized via a heat exchanger (not shown) or the like as a heat source for the carbonizer 1 which heats the biomass. By this configuration, the energy efficiency of the entire power generation system can be further improved.

The sodium hydroxide supply means 8, which is an example of the hydroxide supply means, is configured to supply sodium hydroxide to the molten carbonate 4. When sodium hydroxide is supplied to the molten carbonate 4, carbon dioxide in the molten carbonate 4 reacts with sodium hydroxide to form sodium carbonate (carbonate).

If the purification of the fuel gas is continued in the molten carbonate 4 without supply of sodium hydroxide, sulfur-containing alkali metals, etc. are accumulated, and the molten carbonate 4 is decreased, in the closed vessel 3. Thus, the molten carbonate 4 in the closed vessel 3 needs to be replaced, as appropriate. For example, it is necessary to discharge the molten carbonate 4 and the sulfur-containing alkali metals, etc. within the closed vessel 3 to the outside through a discharge pipe (not shown), which connects the interior and exterior of the closed vessel 3, and supply a fresh carbonate to the closed vessel 3. With the fuel gas purification apparatus of the present invention, however, sodium hydroxide is supplied, as appropriate, to the molten carbonate 4. As a result, the same effects as those of supplying the carbonate to the closed vessel 3, while purifying the fuel gas in the molten carbonate 4, are obtained. Furthermore, carbon dioxide contained in the molten carbonate 4 or the fuel gas (pyrolysis gas) is absorbed by sodium hydroxide to form sodium carbonate. Thus, the amount of carbon dioxide discharged can be decreased.

In replacing the molten carbonate 4 of the closed vessel 3, the above-described supply of the hydroxide to the molten carbonate 4 for indirect supply of the carbonate is not limitative, but the direct supply of the carbonate into the closed vessel 3 is permissible. The carbonate, as referred to here, may contain water or sodium bicarbonate.

The hydroxide supply means is not limited to that supplying sodium hydroxide, but may be one supplying lithium hydroxide, magnesium hydroxide, potassium hydroxide, calcium hydroxide, strontium hydroxide, barium hydroxide, or cerium hydroxide. In short, the hydroxide supply means may be one configured to supply a hydroxide, which can form a carbonate upon reaction with carbon dioxide in the molten carbonate 4, to the molten carbonate 4 within the closed vessel 3.

With the power generation system equipped with the fuel gas purification apparatus of the above-described configuration, the pyrolysis gas and the carbonization product are formed from the biomass by the carbonizer 1. The carbonization product is burned to melt the carbonate within the closed vessel 3, thereby forming the molten carbonate 4, whereas the pyrolysis gas is purified with the molten carbonate 4 to become the fuel gas, which is supplied to the power generation means 20.

As noted above, the purification of the pyrolysis gas is performed within the closed vessel 3 disposed in the furnace 2, so that a device for purifying the fuel gas need not be provided outside the furnace 2. Thus, a saving in the space of the power generation system can be achieved. Moreover, a device of a complicated configuration as in the gas purification device 10 of the conventional technology becomes unnecessary, so that the operability of the apparatus can be enhanced. Besides, the cost related to the power generation system can be cut down, because the need for such a device is obviated. In the present embodiment, the closed vessel 3 is disposed within the furnace 2, but its disposition within the furnace 2 is not necessarily required. For example, the whole or apart of the closed vessel may be disposed outside the furnace 2, and the thermal energy of the carbonization product burned in the furnace 2 may be supplied via a heat exchanger or the like to the whole or part of the closed vessel disposed outside the furnace 2. In this case as well, a high-calorie fuel gas is purified, and power generation can be carried out using this fuel gas.

Furthermore, the fuel gas is purified from the pyrolysis gas inside the closed vessel 3 spaced from the space within the furnace 2. Thus, the fuel gas is not diluted with air, nitrogen, etc. used in the combustion of the carbonization product. As stated earlier, moreover, the fuel gas is deprived of impurities. Because of these facts, the fuel gas having higher calories per unit volume than in conventional technologies can be supplied from the fuel gas supply pipe 6. As described here, the fuel gas purification apparatus of the present invention affords a high-calorie fuel gas upon purification. Thus, the fuel gas purification apparatus of the present invention is useful for application to a power generation system which uses a high temperature fuel cell, for example, a molten carbonate fuel cell (MCFC) or a solid oxide fuel cell (SOFC), as a power generation means.

Embodiment 2

Embodiment 1 has explained the power generation system configured to supply the power generation means 20 with the fuel gas produced by the fuel gas purification apparatus. The present embodiment will explain a fuel synthesis system for synthesizing a liquid fuel from a fuel gas as a starting material.

Figure 2:
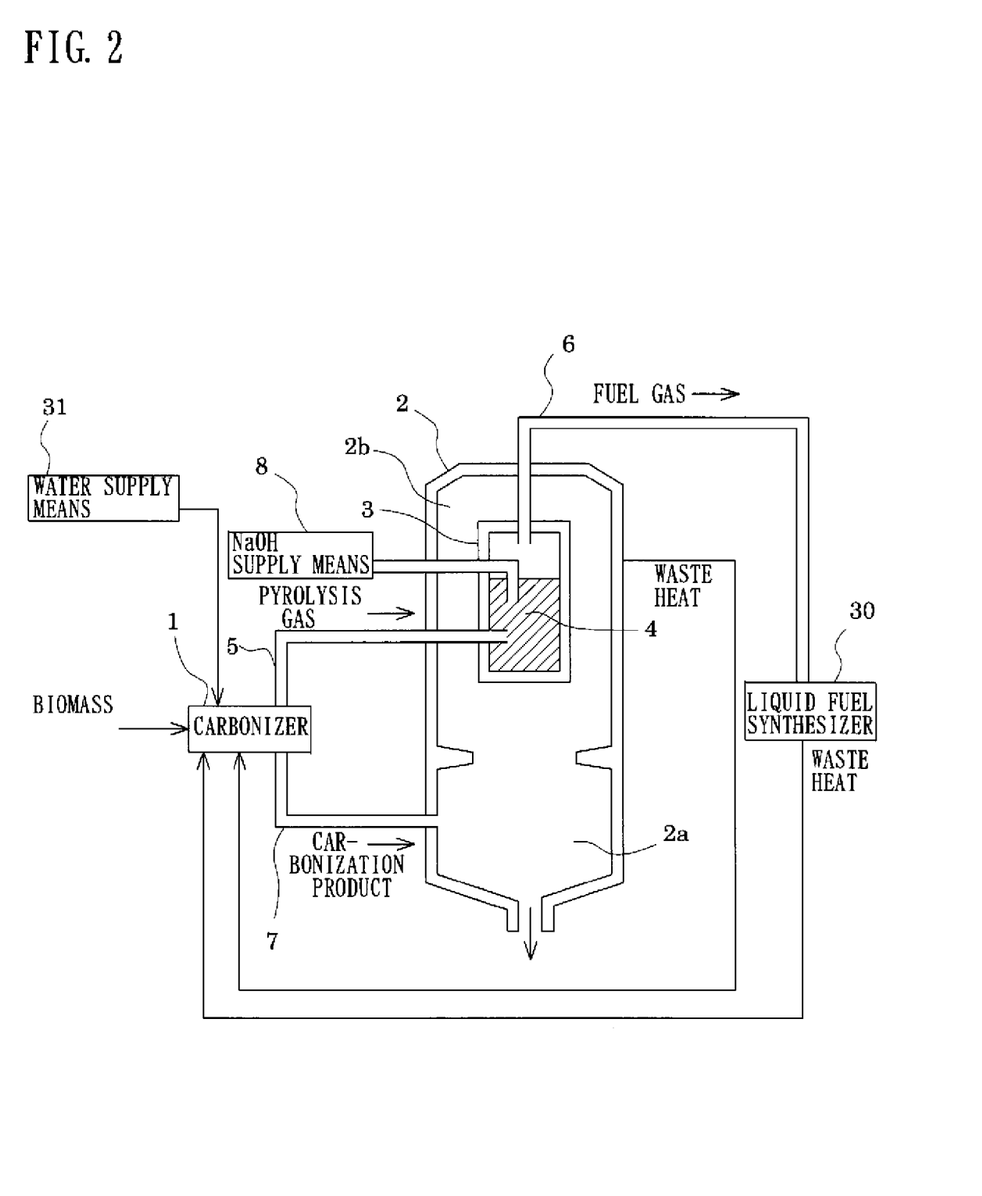
FIG. 2 is a schematic configurational drawing of a fuel synthesis system equipped with a fuel gas purification apparatus according to Embodiment 2.

FIG. 2 is a schematic configurational drawing of a fuel synthesis system equipped with a fuel gas purification apparatus according to Embodiment 2. The same members as those in Embodiment 1 will be assigned the same numerals as in Embodiment 1, and duplicate explanations will be omitted.

The difference of the present embodiment from Embodiment 1 lies in providing a liquid fuel synthesizer 30 for synthesizing a liquid fuel using as a material a fuel gas supplied from a fuel gas supply pipe 6, and a water supply means 31 for supplying water to a carbonizer 1.

The liquid fuel synthesizer 30 is a device for synthesizing a hydrocarbon liquid fuel, such as methanol, dimethyl ether, gasoline, kerosene, or light oil, from a fuel gas. This liquid fuel is generally known to be obtained by bringing a gas consisting essentially of hydrogen and carbon monoxide to a temperature and a pressure suitable for its reaction, and performing its synthesis reaction in the presence of a catalyst.

The water supply means 31 is configured to supply water to the interior of the carbonizer 1. By adjusting the amount of water supplied to the interior of the carbonizer 1, it becomes possible to adjust the proportion of water in the fuel gas supplied through the fuel gas supply pipe 6 to the liquid fuel synthesizer 30. In this manner, the fuel gas produced by the fuel synthesis system of the present embodiment is one in which the ratio between carbon monoxide and hydrogen constituting the fuel gas has been set at a desired ratio.

What type of liquid fuel to be synthesized is determined by the ratio between carbon monoxide and hydrogen serving as the materials. In synthesizing a specific liquid fuel, therefore, it is advisable to adjust the water supply means 31 so that the ratio between carbon monoxide and hydrogen of the fuel gas becomes a ratio suitable for the liquid fuel. As seen here, the fuel synthesis system of the present embodiment has flexibility which enables the desired type of liquid fuel to be produced.

The water supply means 31 is not limited to one which supplies water to the interior of the carbonizer 1. For example, the water supply means 31 may be one which supplies water to the interior of a closed vessel 3, or to an introduction pipe 5 or to the fuel gas supply pipe 6. In short, the water supply means 31 may have a configuration in which water can be added to the fuel gas (pyrolysis gas) before the fuel gas is supplied to the liquid fuel synthesizer 30.

A furnace 2 and the carbonizer 1 are configured such that waste heat generated by the furnace 2 serves as a heat source for the carbonizer 1, which heats biomass, via a heat exchanger (not shown) or the like. By so doing, the energy efficiency of the entire fuel synthesis system can be improved.

Embodiment 3

Embodiment 1 and Embodiment 2 are configured such that the carbonizer 1 is provided apart from the furnace 2, and the waste heat of the furnace 2 is imparted indirectly to the carbonizer 1 via a heat exchanger or the like. However, this configuration is not limitative.

Figure 3:
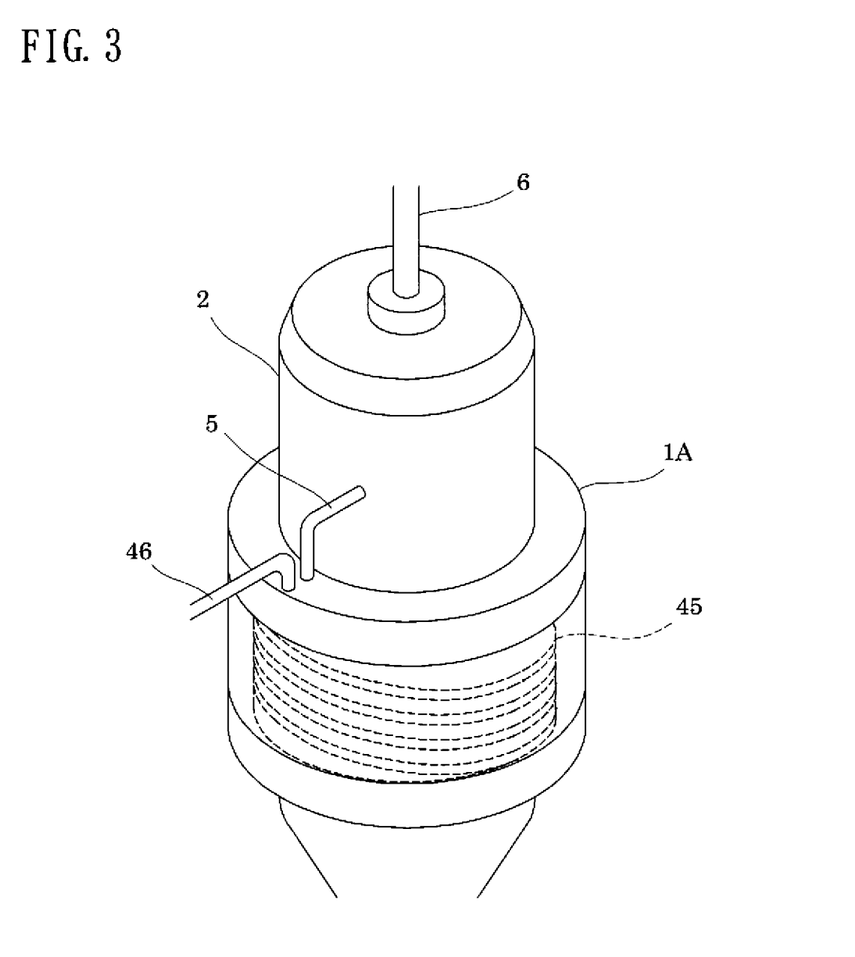
FIG. 3 is a schematic perspective view of a carbonizer and a furnace according to Embodiment 3.
Figure 4:
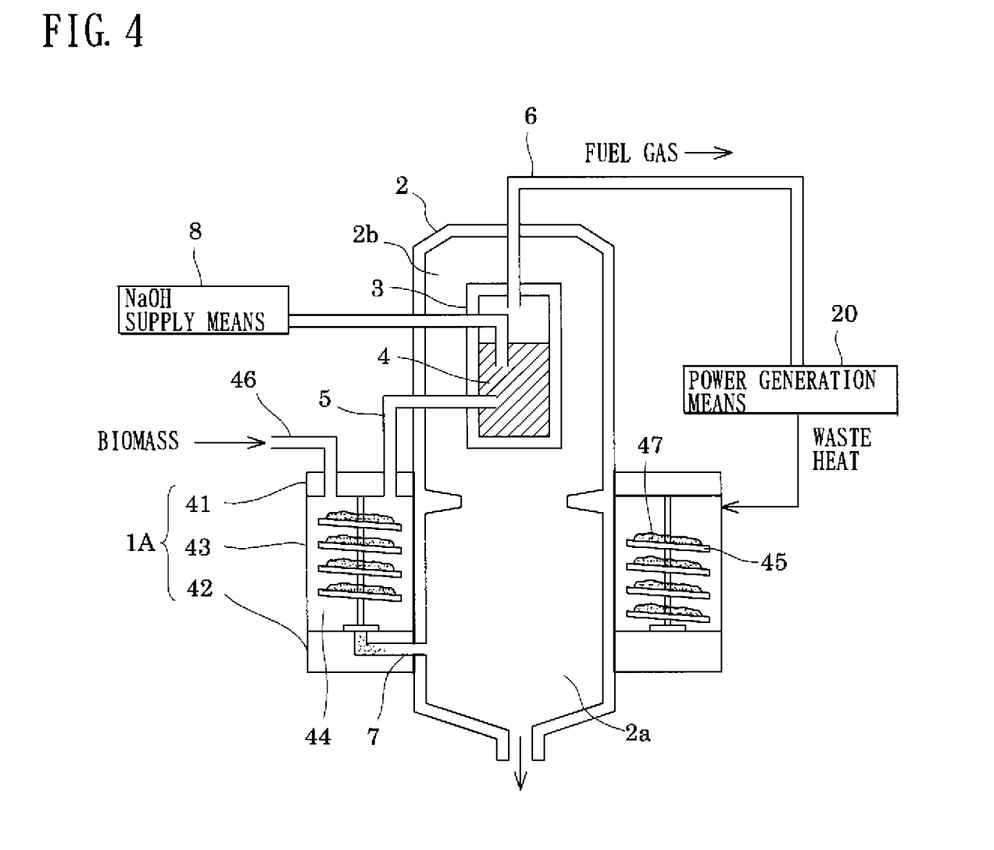
FIG. 4 is a schematic configurational drawing of a power generation system equipped with a fuel gas purification apparatus according to Embodiment 3.

FIG. 3 is a schematic perspective view of a carbonizer and a furnace according to Embodiment 3. FIG. 4 is a schematic configurational drawing of a power generation system equipped with a fuel gas purification apparatus according to Embodiment 3. The same members as those in Embodiment 1 are assigned the same numerals as in Embodiment 1, and duplicate explanations are omitted.

As shown in FIGS. 3 and 4, a carbonizer 1A is formed in a cylindrical shape, and is mounted on a furnace 2 such that the inner surface of the carbonizer 1A is in contact with the outer surface of the furnace 2.

Concretely, the carbonizer 1A is composed of an upper fixing portion 41, a lower fixing portion 42, and a body portion 43. The upper fixing portion 41 and the lower fixing portion 42 are fixed to the furnace 2, while the body portion 43 is supported by the upper fixing portion 41 and the lower fixing portion 42.

The body portion 43 is formed in a cylindrical shape, and its inner surface is in contact with the outer surface of the furnace 2. Bearings (not shown) are provided between the body portion 43 and the upper fixing portion 41, and between the body portion 43 and the lower fixing portion 42. Thus, the body portion 43 is adapted to turn about the furnace 2, and the inner surface of the body portion 43 is adapted to slide over the outer surface of the furnace 2.

Since the body portion 43 contacts the furnace 2, as described above, the waste heat of the furnace 2 is directly transferred to an internal space 44 of the body portion 43 where biomass 47 is charged. Thus, the waste heat of the furnace 2 can be effectively used as a heat source for the carbonizer 1A more efficiently than when the waste heat of the furnace 2 is utilized indirectly via a heat exchanger or the like.

A screw blade 45 formed like a spiral about the furnace 2 is provided within the internal space 44 of the body portion 43. The screw blade 45 receives the biomass 47 through a biomass introduction pipe 46 communicating with the interior 44, and turns along with the body portion 43, thereby transporting the received biomass 47 slowly to a lower part of the body portion 43. Thus, ample heat can be given to the biomass 47, and a pyrolysis gas can be obtained more reliably.

An introduction pipe 5 communicates with the body portion 43, and the pyrolysis gas is guided to a molten carbonate 4 of a closed vessel 3 via the introduction pipe 5. A carbonization product introduction pipe 7 is also in communication with the body portion 43, and a carbonization product is guided to the furnace 2 via the carbonization product introduction pipe 7.

With the power generation system equipped with the fuel gas purification apparatus according to the present embodiment, as described above, the carbonizer 1A is in contact with the furnace 2. Thus, the waste heat of the furnace 2 is used directly as the heat source for the carbonizer 1A. Hence, the waste heat of the furnace 2 can be utilized efficiently, and the thermal efficiency of the entire fuel gas purification apparatus or the entire power generation system can be increased.

In the present embodiment, the power generation system equipped with the fuel gas purification apparatus has been described, but in the fuel synthesis system as well, the carbonizer may be brought into contact with the furnace. In this case, too, the waste heat of the furnace 2 can be utilized efficiently, and the thermal efficiency of the entire fuel synthesis system can be increased.

Embodiment 4

In Embodiments 1 to 3, the pyrolysis gas is purified upon reaction with the molten carbonate 4. To accelerate this reaction, bubble subdividing means may be provided in the closed vessel 3.

Figure 5:
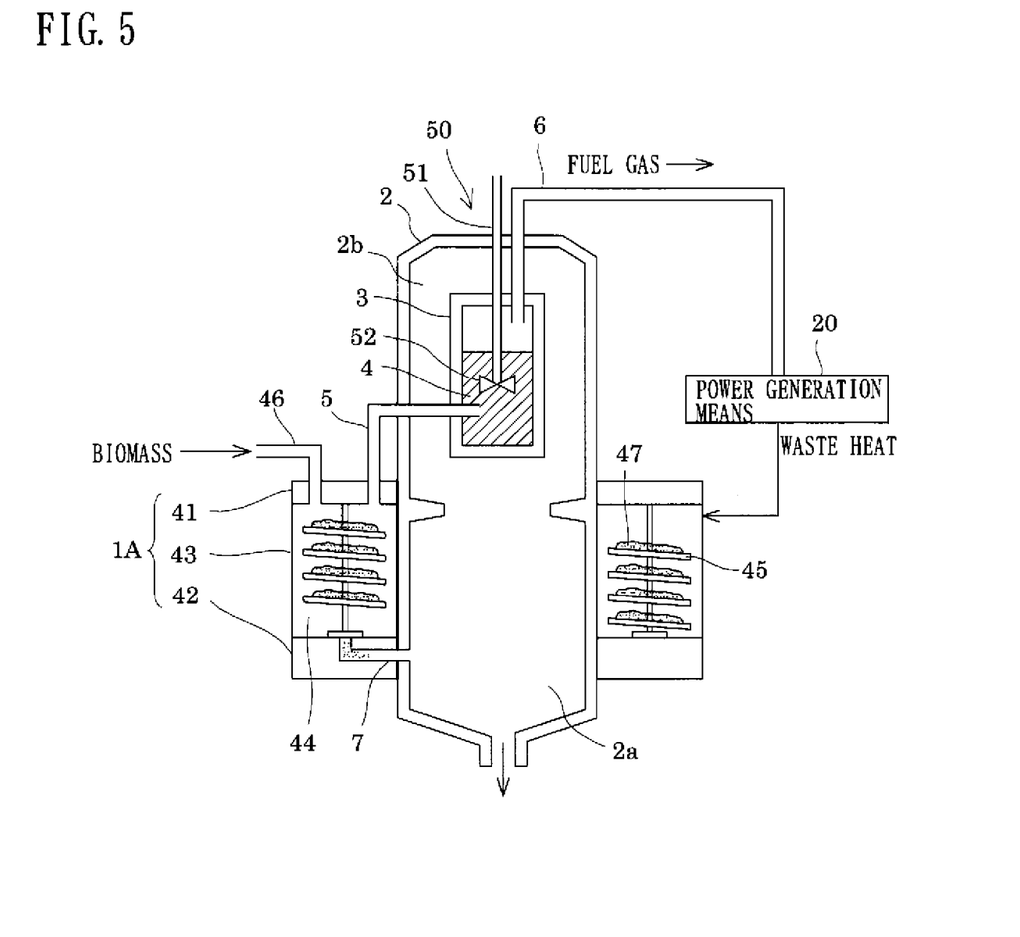
FIG. 5 is a schematic configurational drawing of a power generation system equipped with a fuel gas purification apparatus according to Embodiment 4.

FIG. 5 is a schematic configurational drawing of a power generation system equipped with a fuel gas purification apparatus according to Embodiment 4. The same members as those in Embodiment 3 are assigned the same numerals as those in Embodiment 3, and duplicate explanations are omitted.

As illustrated, a stirrer 50, which is an example of the bubble subdividing means, is mounted in the closed vessel 3. The stirrer 50 is composed of a power portion (not shown), a shaft 51 mounted on the power portion, and a propeller 52 mounted on the leading end of the shaft 51. The shaft 51 is mounted on the closed vessel 3, with the propeller 52 being soaked in the molten carbonate 4 of the closed vessel 3. By so doing, the shaft 51 is turned by the drive of the power portion, whereby the propeller 52 is turned within the molten carbonate 4.

When the propeller 52 is turned within the molten carbonate 4, as mentioned above, bubbles of a pyrolysis gas introduced into the molten carbonate 4 are finely divided for subdivision. In conformity with their surface areas increased thereby, the bubbles of the pyrolysis gas can contact the molten carbonate 4 with greater contact areas. Hence, the reaction between the pyrolysis gas and the molten carbonate 4 is accelerated, and the pyrolysis gas can be purified more promptly.

In the present embodiment, the power generation system equipped with the fuel gas purification apparatus has been described, but in the fuel synthesis system as well, the stirrer 50 may be provided in the closed vessel 3. In this case, too, bubbles of the pyrolysis gas are finely divided, and thus the pyrolysis gas can be purified more promptly.

Figure 6:
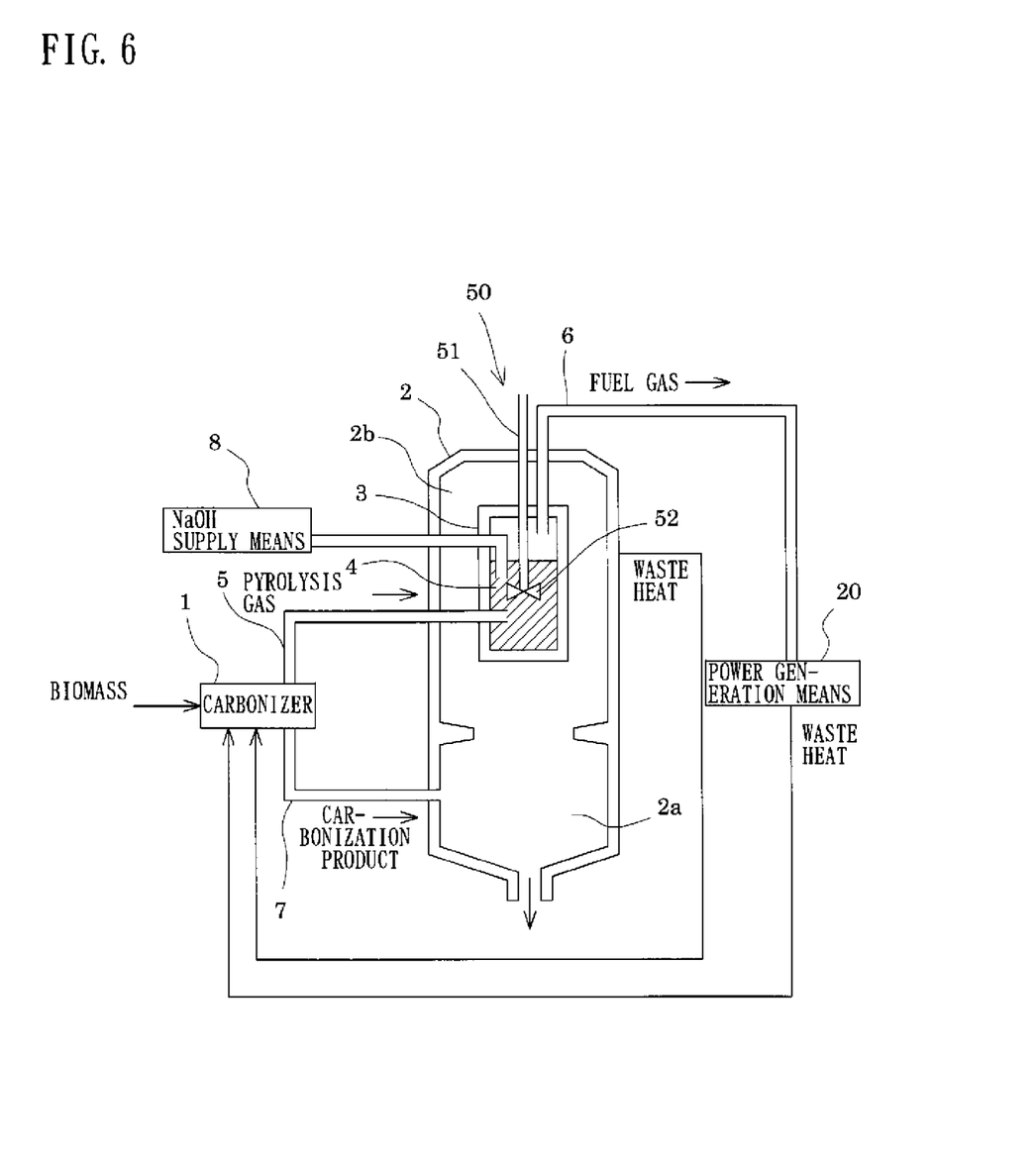
FIG. 6 is a schematic configurational drawing of the power generation system equipped with the fuel gas purification apparatus according to Embodiment 4.

In the present embodiment, the fuel gas purification apparatus provided with the stirrer 50 based on Embodiment 3 has been illustrated. As shown in FIG. 6, however, the fuel gas purification apparatus provided with the stirrer 50 based on Embodiment 1 may be adopted. That is, in the fuel gas purification apparatus having the carbonizer out of contact with the outer surface of the furnace, the stirrer 50 may be provided in the closed vessel 3. Alternatively, in the fuel gas purification apparatus having the closed vessel 3 outside the furnace 2, for example, having the whole or part of the closed vessel disposed outside the furnace 2, the stirrer 50 may be provided in the closed vessel 3. In any of the fuel gas purification apparatuses, bubbles of the pyrolysis gas are finely divided by the stirrer 50, whereby the pyrolysis gas can be purified more promptly.

INDUSTRIAL APPLICABILITY

The present invention can be effectively used in an industrial field where equipment gasifying biomass and using the gas as a material for fuels or liquid fuels is used, produced, and sold.

The invention claimed is:

1. A fuel gas purification apparatus, comprising:
a carbonizer which pyrolyzes biomass to produce a pyrolysis gas and a carbonization product;
a furnace which is supplied with the carbonization product produced by the carbonizer and which burns the carbonization product;
a closed vessel accommodating a molten carbonate which is a carbonate melted by heat of the carbonization product burned in the furnace;
an introduction pipe disposed to introduce the pyrolysis gas produced by the carbonizer into the molten carbonate in the closed vessel; and
a fuel gas supply pipe disposed to send a fuel gas, which is the pyrolysis gas sent through the introduction pipe, passed through the molten carbonate, and purified by reaction with the molten carbonate, from within the closed vessel to an outside of the furnace.

2. The fuel gas purification apparatus according to claim 1, wherein
the carbonizer is adapted to pyrolyze the biomass by waste heat of the furnace.

3. The fuel gas purification apparatus according to claim 1, wherein
the closed vessel is disposed within the furnace.

4. The fuel gas purification apparatus according to claim 1, further comprising
hydroxide supply means for supplying a hydroxide to the molten carbonate.

5. The fuel gas purification apparatus according to claim 1, wherein
the molten carbonate contains a catalyst.

6. The fuel gas purification apparatus according to claim 1, further comprising
bubble subdividing means for finely dividing bubbles of the pyrolysis gas having passed through the molten carbonate.

7. The fuel gas purification apparatus according to claim 1, wherein
the carbonizer contacts an outer surface of the furnace.

8. A power generation system, comprising:
the fuel gas purification apparatus according to claim 1; and
power generation means for generating electric power with use of the fuel gas from the fuel gas supply pipe.

9. The power generation system according to claim 8, wherein
the power generation means is equipped with a high temperature fuel cell having a fuel electrode which is fed with the fuel gas from the fuel gas supply pipe.

10. The power generation system according to claim 8, wherein
the power generation means is equipped with a gas engine which is operated by the fuel gas from the fuel gas supply pipe, and a generator which is actuated by operation of the gas engine.

11. The power generation system according to claim 8, wherein
the power generation means includes a turbine combustor which burns the fuel gas from the fuel gas supply pipe, and a gas turbine which obtains power upon expansion of the fuel gas from the turbine combustor to drive a generator.

12. The power generation system according to claim 8, wherein
the carbonizer is adapted to pyrolyze the biomass by waste heat of the power generation means.

13. A fuel synthesis system, comprising:
the fuel gas purification apparatus according to claim 1;
a liquid fuel synthesizer which synthesizes a liquid fuel from the fuel gas from the fuel gas supply pipe; and
water supply means which supplies water into the carbonizer or the closed vessel so that a proportion of water in the fuel gas supplied to the outside of the furnace can be adjusted.

14. The fuel synthesis system according to claim 13, wherein
the carbonizer is adapted to pyrolyze the biomass by waste heat of the liquid fuel synthesizer.

* * * * *

UNITED STATES PATENT AND TRADEMARK OFFICE
CERTIFICATE OF CORRECTION

PATENT NO. : 8,636,818 B2
APPLICATION NO. : 12/865868
DATED : January 28, 2014
INVENTOR(S) : Kawase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this
Twenty-second Day of September, 2015

Michelle K. Lee
*Director of the United States Patent and Trademark Office*